US006422711B1

(12) United States Patent
Chao et al.

(10) Patent No.: US 6,422,711 B1
(45) Date of Patent: Jul. 23, 2002

(54) HIDDEN RIB FOR REFLECTOR OF LED DISPLAY

(75) Inventors: Yung Chun Chao; Kuen Feng Yang; Huai Te Hou; Kuo-Lung Hsu, all of Taipei (TW)

(73) Assignee: Lite-On Electronics, Inc., Taipei (TW)

( * ) Notice: Subject to any disclaimer, the term of this patent is extended or adjusted under 35 U.S.C. 154(b) by 15 days.

(21) Appl. No.: 09/637,876

(22) Filed: Aug. 15, 2000

(51) Int. Cl.[7] .............................................. G01D 11/28

(52) U.S. Cl. ............................ 362/29; 362/23; 362/30; 362/812; 40/580; 340/815.54

(58) Field of Search ............................ 362/23, 29, 30, 362/49, 812; 40/578, 580; 340/815.53, 815.54

(56) References Cited

U.S. PATENT DOCUMENTS 4,578,617 A * 3/1986 Kerr, III et al. ............ 313/512
5,161,872 A * 11/1992 Sasaki et al. ................ 362/29

* cited by examiner

*Primary Examiner*—Stephen Husar
*Assistant Examiner*—Guiyoung Lee
(74) *Attorney, Agent, or Firm*—Rosenberg, Klein & Lee

(57) ABSTRACT

A hidden rib for the reflector of an LED display is disclosed, wherein a hollowed optic displaying section is formed in a reflector. The hollowed optic displaying section is connected by a hidden rib, the rib is installed at a plane lower than a surface of the reflector. The hollowed optic displaying section on the reflector can be filled with diffusion agent (or adhered with diffusion film on the reflector) so that the surface of the reflector is formed as a flat smooth plane. When light from the light emitting diode radiates out through the optic displaying section and the epoxy. The light can be diverged to the whole optic displaying section so that the continuous text or pattern optic displaying section does not be interrupted for presenting a beautiful appearance and a clear text or pattern.

5 Claims, 8 Drawing Sheets

HIDDEN RIB FOR REFLECTOR OF LED DISPLAY

FIELD OF THE INVENTION

The present invention relates to a hidden rib for the reflector of an LED display, and especially to a hidden rib for enhancing the beauty of the appearance and clear the text or pattern to be displayed.

BACKGROUND OF THE INVENTION

The text or pattern optic display of a light emitting diode has been widely used in the home using electric devices, stereos, instruments, and other products. In that, the reflector 10*a* of the display is formed with a hollowed text or pattern optic displaying section 11*a* (see FIGS. 1 and 2) so that the light from the light emitting diode can be radiated through the hollowed optic displaying section 11*a* on the reflector 10*a*. However, in general, this induces an unbeautiful appearance. It is primary due to the interruption of the text or pattern presenting as the light from the light emitting diode radiates through the optic displaying section 11*a* on the reflector 10*a*. It is difficult to be molded. The general way for overcoming this phenomenon is used an exposed rib (connecting strip) 12*a* so that the hollowed optic displaying section 11*a* will be continuous. Therefore, the original continuous optic displaying section will be interrupted (see FIG. 3) so as the beauty is deteriorated.

One of the conventional way is adhered with a printing film to enhance the beauty of the appearance. Not only the cost is increased (about 10 to 20%), but also the illumination is reduced. Moreover, the complexity of the light emitting diode is incremented.

Therefore, there is an eager demand for a novel rib for the reflector of an LED display which can resolve the problem encountered in the prior art design.

SUMMARY OF THE INVENTION

Accordingly, the primary object of the present invention is to provide a hidden rib for the reflector of a LED display, in which by a hidden rib and the diffusion agent in the optic displaying section, the optic displaying section will not be interrupted for enhancing the beauty of the appearance and clear the text or pattern to be displayed.

Another object of the present invention is to provide a hidden rib for the reflector of an LED display, in which by a hidden rib and the diffusion film adhered on the reflector. The optic displaying section will not be interrupted for saving printing film and thus reducing manufacturing cost, using no printing film and thus simplifying the manufacturing cost and therefore, increasing illumination because of no printing film being used.

In order to achieve the above object, the present invention provides a hidden rib for the reflector of an LED display, wherein a hollowed optic displaying section is formed in a reflector. The hollowed optic displaying section is connected by a hidden rib. The rib is installed at a plane lower than a surface of the reflector. The hollowed optic displaying section on the reflector can be filled with diffusion agent (or adhered with diffusion film on the reflector) so that the surface of the reflector is formed as a flat smooth plane. When light from the light emitting diode radiates out through the optic displaying section and the epoxy. The light can be diverged to the whole optic displaying section so that the continuous text or pattern optic displaying section does not be interrupted for presenting a beautiful appearance and a clear text or pattern.

The various objects and advantages of the present invention will be more readily understood from the following detailed description when reading in conjunction with the appended drawing.

DETAILED DESCRIPTION OF THE PREFERRED EMBODIMENTS

Figure 1:
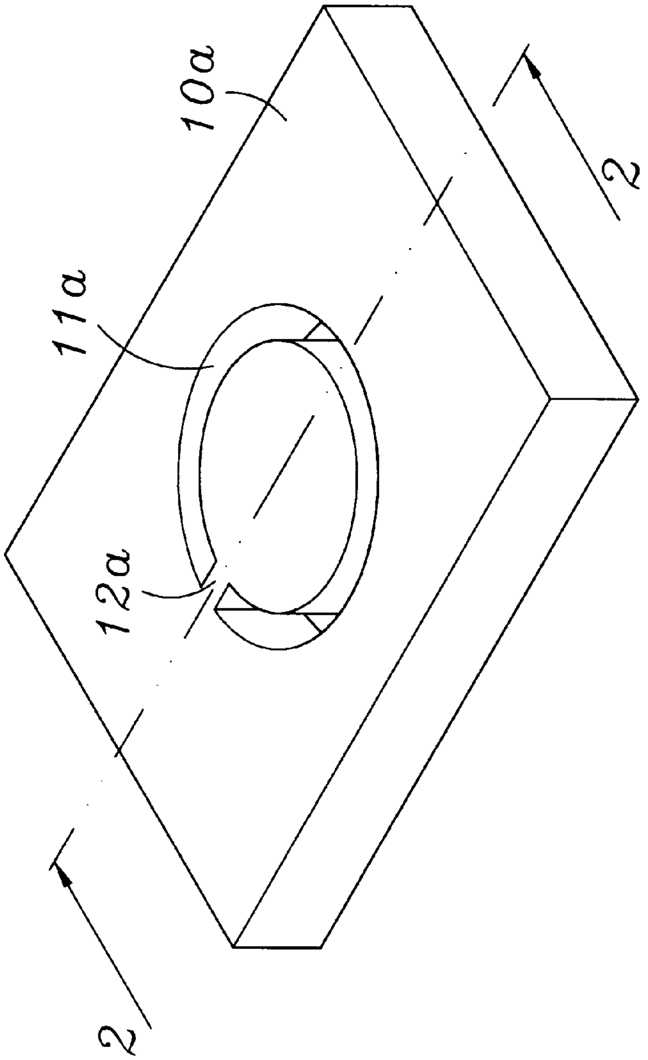
FIG. 1 PRIOR ART
FIG. 1 is a perspective view showing that a hollowed text or pattern optic displaying section is provided with an exposed rib in the conventional light emitting diode display.
Figure 2:
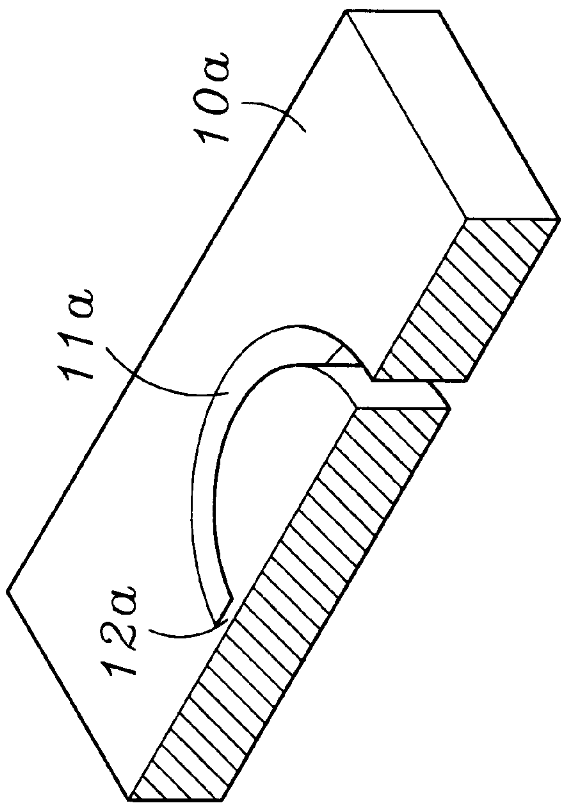
FIG. 2 PRIOR ART
FIG. 2 is cross-sectional view along 2—2 in FIG. 1.
Figure 3:
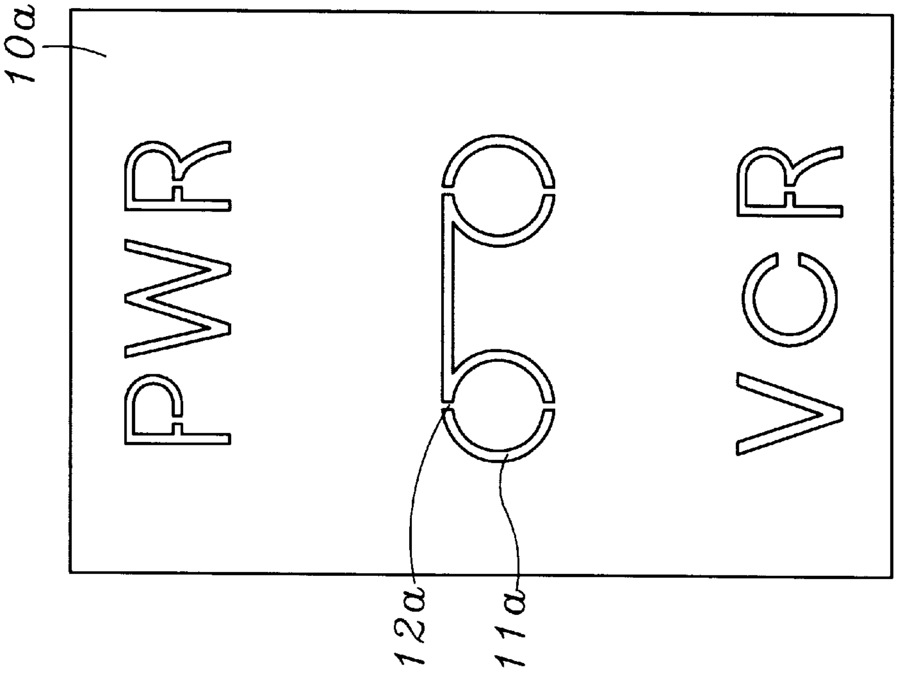
FIG. 3 PRIOR ART
FIG. 3 shows the schematic view of the use of a conventional light emitting diode display.
Figure 4:
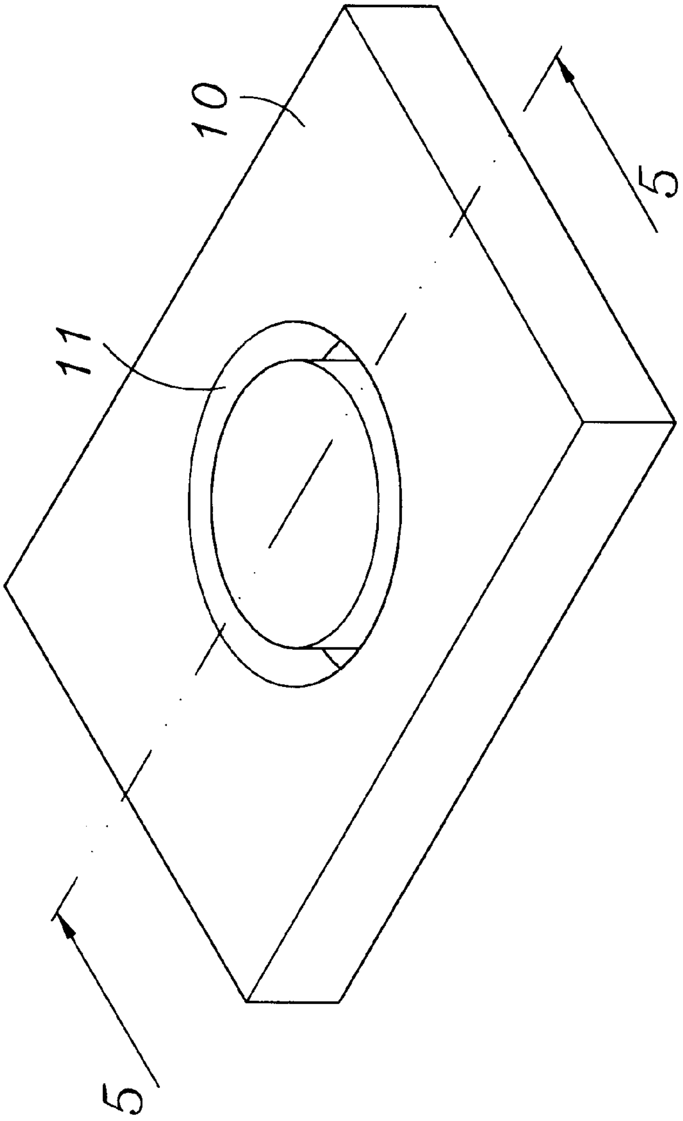
FIG. 4 is a perspective view of the present invention.
Figure 5:
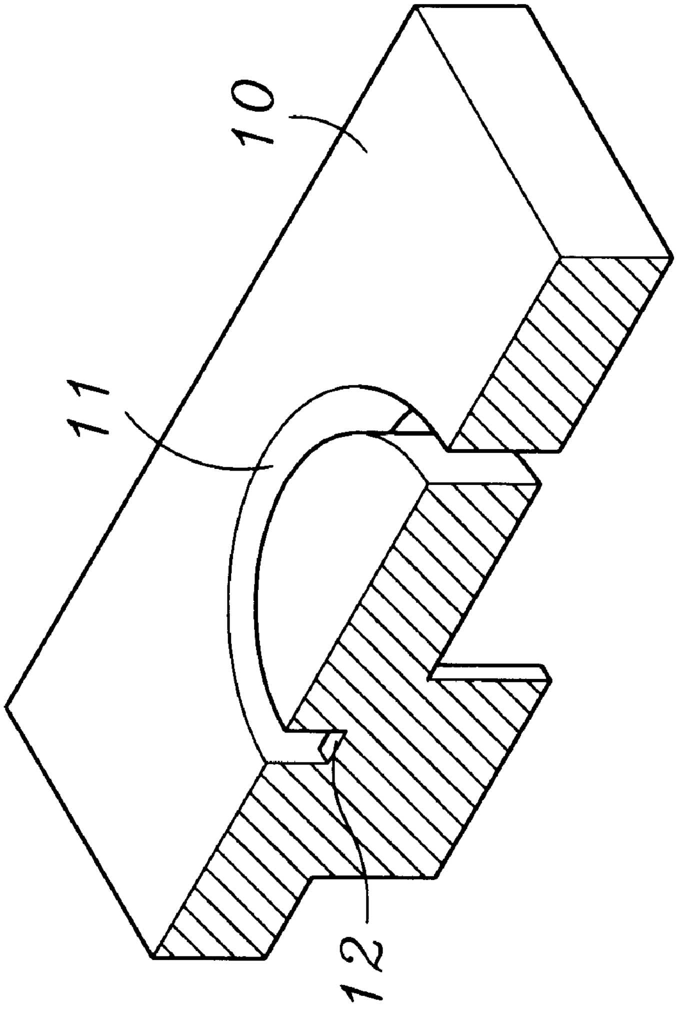
FIG. 5 is a cross-sectional view along 5—5 of FIG. 4.

With reference to FIGS. 4 and 5, the hidden rib for the reflector of an LED display of the present invention is illustrated. The reflector 10 of the display is made of an opaque material. A hollowed text or pattern optic displaying section 11 is formed in the reflector 10 so that light from two light emitting diodes (LED) (not shown) may be radiated out from the text or pattern optic displaying section 11 hollowed in the reflector 10. In the present invention, at the place that the text or pattern can not be connected, but it is necessary to be connected. Instead of using a conventional exposed rib (connecting ribs), a rib 12 runs across the back side of the reflector 10 (see FIG. 5) so as to be formed as a hidden type rib 12. The rib 12 is installed at the plane lower than the plane of the reflector 10. Therefore, the hidden rib for the reflector of a LED display of the present invention is formed.

Figure 6:
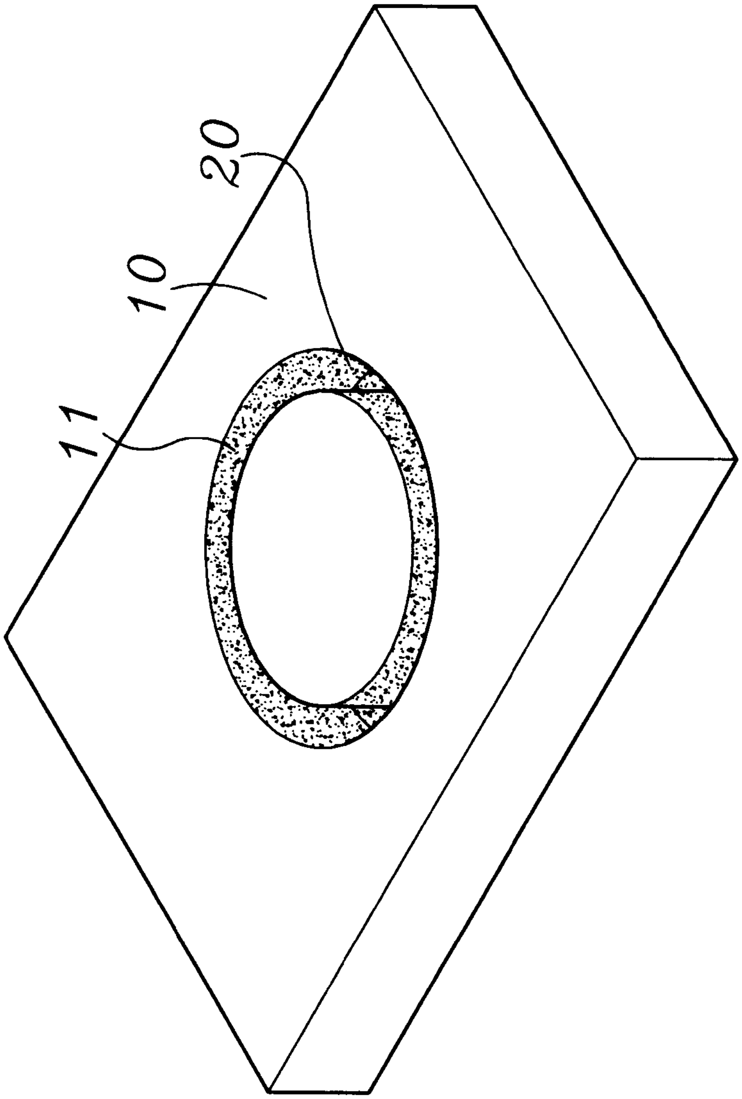
FIG. 6 is a perspective view showing that the present invention has been filler with epoxy.
Figure 7:
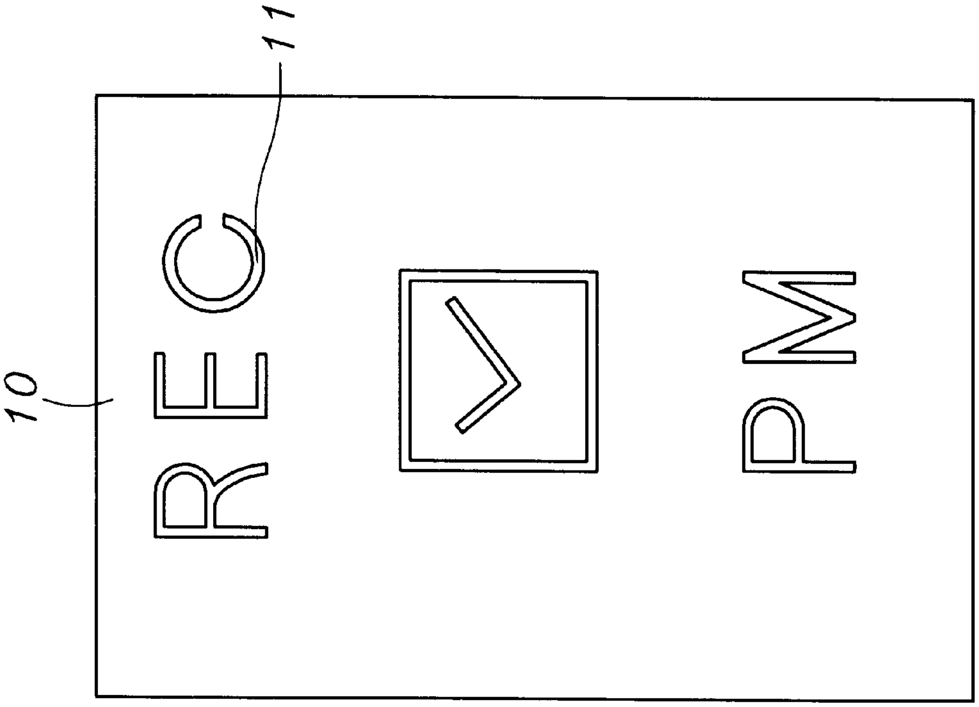
FIG. 7 is a schematic view showing the use of the present invention.

As shown in FIG. 6, in the present invention, the hollowed text or pattern optic displaying section 11 on the reflector 10 can be filled with epoxy 20 so that the surface of the reflector 10 is formed as a flat smooth plane. When light from the light emitting diode radiates out through the text or pattern optic displaying section and the epoxy 20. The light can be diverged to the whole text or pattern optic displaying section 11 so that the continuous text or pattern optic displaying section does not be interrupted (see FIG. 7) for presenting a beautiful appearance and a clear text or pattern.

Figure 8:
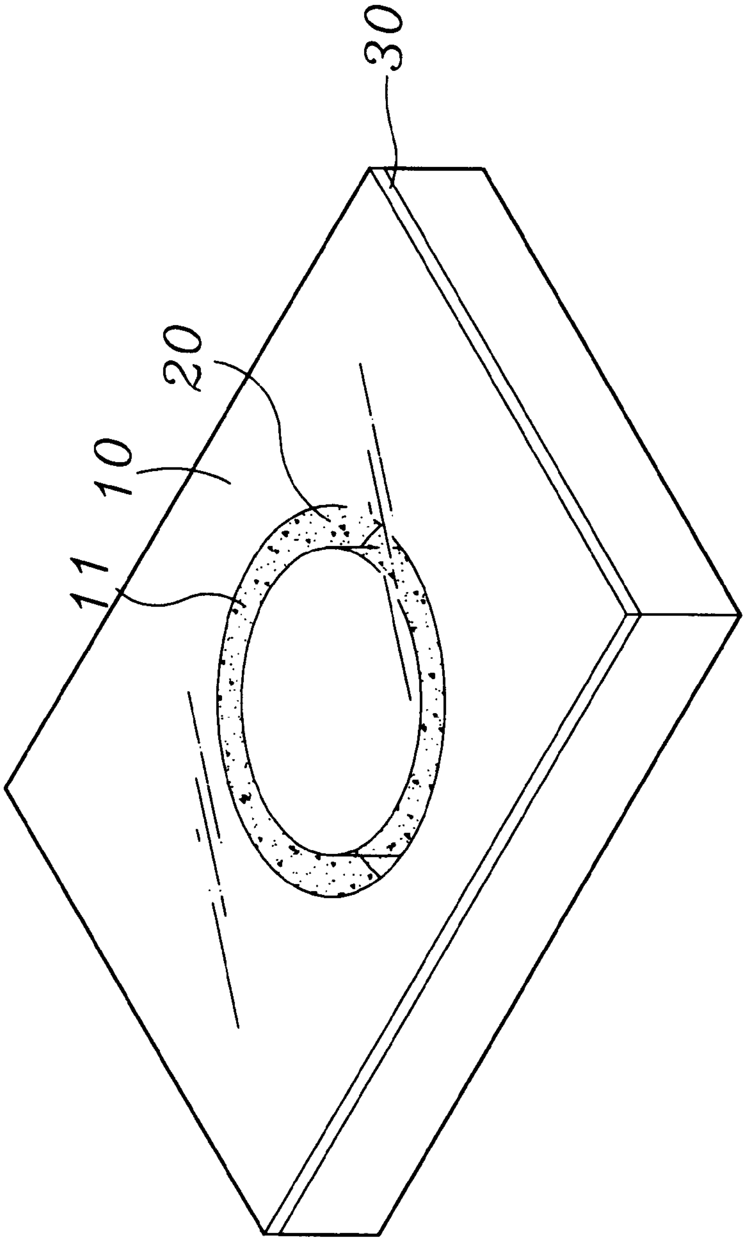
FIG. 8 is a perspective view showing that the present invention is adhered with a diffusion film.

As shown in FIG. 8, a light diffusion film 30 can be adhered to the reflector 10. When light from the light emitting diode radiates through the text or pattern optic displaying section 11 on the reflector 10, the light will diverge to the whole text or pattern optic displaying section 10 so that the continuous optic section will not be interrupted. The improvement of the present invention will not increase manufacturing cost and the text and pattern can be formed integrally. Thus, the manufacturing cost can be saved and the manufacturing material is also saved.

Besides, as light diffusion film 30 is adhered to the reflector 30, it is selectable to fill epoxy into the text or pattern optic displaying section 11, as such, an LED chip can be firmly secured so as to increase the stability in production. Furthermore, the filling epoxy can be consisted of divergent agent for enhancing divergent effect.

Alternatively, transparent epoxy or epoxy without divergent agent can be adhered thereon for reducing cost.

As above description, the hidden rib for the reflector of a LED display according to the present invention has the following effects:

(1) Enhancing the appearance (a continuous presentation without any interruption).

(2) Clearly presenting the text or pattern.

(3) If epoxy with diffusion agent is filled in the text or pattern optic displaying section, then the present invention has the advantages of:

1. Saving printing film and thus reducing manufacturing cost.
2. Using no printing film and thus simplifying the manufacturing cost.
3. Increasing illumination because of no printing film being used.

In summary, the present invention has improved the defect in the prior art, in the prior art, the exposed ribs used in the reflector in the conventional display so that the optic displaying section is interrupted. The printing film is not used so as to present a beautiful appearance and therefore, the manufacturing process is easier.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An LED display reflector comprising:

at least one light emitting diode;

an optically opaque base plate having upper and lower surfaces, said optically opaque base plate having a passage formed therethrough, said passage defining an outer display periphery;

an optically opaque display member having upper and lower surfaces and being received within said passage of said optically opaque base plate, said upper and lower surfaces of said optically opaque display member being substantially co-planar with said respective upper and lower surfaces of said optically opaque base plate, said optically opaque display member defining an inner display periphery, said inner and outer display peripheries being spaced apart each from the other; and, a rib member fixedly secured to said lower surfaces of said optically opaque base plate and said optically opaque display member, respectively, said rib member maintaining a transmission space formed between said inner display periphery and said outer display periphery, whereby light emitted by said at least one light emitting diodes impinges on said lower surfaces of said optically opaque base plate and said optically opaque display member, said light being transmitted through said transmission space and being reflected between said optically opaque base plate and said optically opaque display member such that said light appears to have a substantially uniform intensity when transmitted beyond said upper surfaces of said optically opaque base plate and said optically opaque display member, said inner and outer display peripheries being selectively contoured for producing desired light patterns and effects.

2. The LED display reflector as recited in claim 1 wherein said transmission space is filled with an epoxy resin having a diffusion agent.

3. The LED display reflector as recited in claim 1 wherein a diffusion film is formed on said upper surfaces of said optically opaque base plate and said optically opaque display member.

4. The LED display reflector as recited in claim 1 wherein said transmission space is filled with an epoxy resin and a diffusion film is formed on said upper surfaces of said optically opaque base plate and said optically opaque display member.

5. The LED display reflector as recited in claim 1 wherein an optically transparent epoxy resin fills said transmission space.

* * * * *